United States Patent [19]

Fauss et al.

[11] Patent Number: 4,988,774

[45] Date of Patent: Jan. 29, 1991

[54] CYANO-CONTAINING POLYMERS

[75] Inventors: Rudolf Fauss, Cologne; Mark Seidler, Leverkusen; Joseph W. Witle, deceased, late of Haferkamp; Margarethe H. Witte, heir; Karin Witte, heir, both of Cologne; Klaus G. Witte, heir, Berlin, all of Fed. Rep. of Germany

[73] Assignee: Bayer Aktiengesellschaft, Leverkusen, Fed. Rep. of Germany

[21] Appl. No.: 547,568

[22] Filed: Jul. 2, 1990

Related U.S. Application Data

[62] Division of Ser. No. 231,739, Aug. 12, 1988.

[30] Foreign Application Priority Data

Aug. 12, 1987 [DE] Fed. Rep. of Germany ....... 3728927

[51] Int. Cl.$^5$ ............................................... C08F 8/30
[52] U.S. Cl. .................................. 525/340; 525/332.8; 525/332.9; 525/333.1; 525/333.2; 525/374; 525/377
[58] Field of Search ....................... 525/340, 374, 377

[56] References Cited

U.S. PATENT DOCUMENTS 4,058,879 11/1977 Lentz et al. .......................... 526/297
4,596,756 6/1986 Yamanouchi et al. .............. 526/297

*Primary Examiner*—Bernard Lipman
*Attorney, Agent, or Firm*—Sprung Horn Kramer & Woods

[57] ABSTRACT

Cyano-containing polymers can be prepared from polymers having isolated, non-activated double bonds and hydrogen cyanide in the presence of catalysts of the formula $$Ni[P(OR^1)_3]_n \qquad (I)$$

in which
 $R^1$ stands for alkyl or aryl and
 n denotes the number 3 or 4, and also in the presence of cocatalysts of the formula $$AlR^2{}_{3-m}Hal_m \qquad (II)$$

in which
 $R^2$ stands for hydrogen, alkyl or cyano,
 Hal stands for chlorine, bromine or cyano and
 m denotes the number 0, 1, 2 or 3, and also, if appropriate, in the presence of a phosphite of the formula $$P(OR^1)_3 \qquad (III)$$

in which $R^1$ has the given meaning, in inert organic solvents at 40° to 100° C.

17 Claims, No Drawings

CYANO-CONTAINING POLYMERS

This is a division of application Ser. No. 07/231,739, filed 8/12/88, now pending.

SUMMARY OF THE INVENTION

The invention relates to cyano-containing polymers which can be prepared by reacting polymers having isolated, non-activated double bonds with hydrogen cyanide in the presence of catalysts of the formula $$Ni[P(OR^1)_3]_n \quad (I)$$

in which
R$^1$ stands for alkyl or aryl and
n denotes the number 3 or 4,
and in the presence of cocatalysts of the formula $$AlR^2{}_{3-m}Hal_m \quad (II)$$

in which
R$^2$ stands for hydrogen, alkyl or cyano,
Hal stands for chlorine, bromine or cyano and m denotes the number 0, 1, 2 or 3,
and, if appropriate, in the presence of a phosphite of the formula $$P(OR^1)_3 \quad (III)$$

in which R$^1$ has the given meaning, in inert organic solvents at 40° to 100° C. and, if necessary, hydrogenating the double bonds which did not react with hydrogen cyanide.

DETAILED DESCRIPTION OF THE INVENTION

Alkyls which may be mentioned are straight-chain and branched aliphatic hydrocarbon radicals having 1 to 8 C atoms, preferably 1 to 4 C atoms such as methyl, ethyl, propyl, isopropyl, butyl, isobutyl, hexyl and octyl.

Aryls which may be mentioned are unsubstitued and alkyl- or aryl-substituted phenyl and naphthyl.

Copolymers of acrylonitrile and butadiene are distinguished by their resistance to oil and petrol, their heat resistance and also by their high resistance to abrasion. The products obtained by hydrogenation of these copolymers are also distinguished by these properties. The nitrile group has considerable influence on these properties.

Until now, nitrile groups have been introduced into rubber essentially only via acrylonitrile. However, it is a known fact from polymer chemistry that acrylonitrile can unfortunately not be copolymerized with ethylene and α-olefins to obtain other cyano-containing rubbers in this manner. For similar reasons, no other cyano-containing monomer has been able to become accepted as the starting material for preparing industrial rubbers. It was therefore desirable to provide further cyano-containing rubbers and to find a widely applicable process which makes it possible to incorporate nitrile groups into rubbers without acrylonitrile and other monomers which can be used or are available only to a limited extent.

The polymers which can be prepared according to the invention basically differ from those which are obtained by copolymerization of acrylonitrile with conjugated dienes or by hydrogenation of those products. Nitrile groups which are introduced by means of acrylonitrile are necessarily always present in the polymer main chain, as can be seen from the simplified formula scheme of the butadiene-acrylonitrile copolymer:

$$+CH_2-CH=CH-CH_2\overline{)_x}+CH-CH_2\overline{)_y}$$
$$\qquad\qquad\qquad\qquad\qquad |$$
$$\qquad\qquad\qquad\qquad\quad CN$$

The polymers used for the hydrocyanation according to the invention are those which have a proportion of olefinic side groups—the proportion being of varying size depending on their process of preparation. Accordingly, the nitrile groups introduced are also present in the side chain (for rarer exceptions cf. the following formula scheme). This is illustrated in the following formula scheme with the example of 1,2-polybutadiene where structures A to D represent possible structures which can be present in varying amounts in the cyano-containing polymers which can be prepared according to the invention:

$$+CH_2-CH\overline{)_x} \xrightarrow{HCN} +CH_2-CH\overline{)_x} \qquad A$$
$$\quad\;\;|\qquad\qquad\qquad\qquad\;\;|$$
$$\;CH=CH_2\qquad\qquad CH_2-CH_2CN$$

$$+CH_2-CH\overline{)_x} \qquad B$$
$$\quad\;\;|$$
$$\;CH-CN$$
$$\quad\;\;|$$
$$\;CH_3$$

$$\qquad CN \qquad\qquad\qquad\qquad\qquad C$$
$$\qquad\;|$$
$$+CH_2-C\overline{)_x}$$
$$\qquad\;|$$
$$\;CH_2-CH_3$$

$$+CH_2-CH\overline{)_x} \qquad D$$
$$\;|\qquad\;|$$
$$CN\;\;CH_2-CH_3$$

The main proportions are present as structural element A and, to a smaller extent, as structural element B; structural elements C and D which can conceivably arise by isomerization are evidently only present to a minor extent. As can easily be seen, polymers having structural elements A to D cannot be prepared other than according to the invention due to non-existing or commercially unavailable monomers.

Even if polymers are used which carry the double bonds almost exclusively in the main chain, other products than those which can be obtained by copolymerization with acrylonitrile as a building block are formed according to the invention.

Thus, hydrocyanated 1,4-polybutadiene also contains $$+CH_2-CH=CH-CH_2\overline{)_x} \xrightarrow{HCN}$$

$$+CH_2-CH-CH_2-CH_2\overline{)_x}$$
$$\qquad\;|$$
$$\;CN$$

a different proportion of CN groups from that of synthetic rubbers obtained by hydrogenation of butadiene-acrylonitrile copolymers:

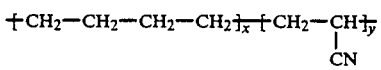

Moreover, as a result of isomerization reactions during the hydrocyanation, two CN groups can also be directly adjacent to one another, as the following idealized formula diagram illustrates:

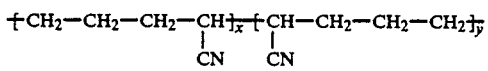

In addition, the ethyl side groups which are always present in hydrogenated butadiene-acrylonitrile rubbers by virtue of the 1,2-polymerization of the butadiene (by hydrogenation of the vinyl side groups) can be formed in the polymers according to the invention only insofar as such vinyl groups are not fully converted by reaction with HCN. The site or the degree of the hydrocyanation according to the invention in comparison with the starting polymer can be determined either by nuclear magnetic resonance spectroscopy or by infrared spectroscopy.

The hydrocyanation of low molecular weight olefins using nickel(O) catalysts in the presence of co-catalysts is known (Advances in Catalysis, Vol. 33 (1985), 1–46). The hydrocyanation of butadiene via pentenonitrile to give adipodinitrile has been developed into a large-scale industrial process.

Still, the hydrocyanation of polymers having isolated, non-activated double bonds was not to be expected. Nor is it possible, for example, to carry it out successfully with the catalyst system of the formula

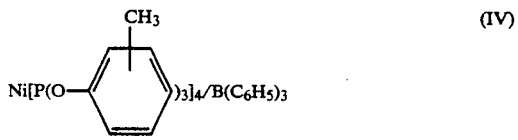

which is exceptionally suitable for the adipodinitrile process which is carried out industrially.

In addition, there are many reactions in low molecular weight chemistry which cannot be applied or can be applied only with difficulty to high polymers. Thus, for example, the addition reaction of hydrochloric acid with olefins is a process (for example HCl addition to ethylene) which is carried out industrially, but the addition of hydrochloric acid to double bonds in polymers has not become important because of side reactions such as crosslinking.

As is known from the literature, the cocatalysts used for the preparation of the polymers according to the invention initiate crosslinking reactions in unsaturated polymers. Consequently, it had to be expected that significant crosslinking would occur in the process according to the invention during the long reaction time.

The starting polymers suitable for the reaction according to the invention are formed by polymerization of conjugated dienes or by copolymerization thereof with monoolefins or substitution products thereof. Monomers or comonomers for starting polymers which are suitable according to the invention are, for example, butadiene, isoprene, styrene, acrylonitrile, acrylic esters, ethylene, propylene or butylene.

Preferred polymers in addition to polybutadiene and polyisoprene are the alternating copolymers butadiene-propylene and also isoprene-ethylene and the copolymers butadiene-acrylonitrile and butadiene-styrene. The dienes can be polymerized by 1,2- and/or 1,4-linkage. They can have cis- or trans-substituted double bonds. Preference is given to the 1,2-isomers. Polymers containing vinyl groups are very particularly preferred. The starting polymers have a molecular weight from 1,500 to 500,000, preferably 50,000 to 350,000. They are prepared according to known processes.

Preferably, the radicals $OR^1$ in the nickel(O) catalysts of the formula (I) used according to the invention are derived from phenols or alkylphenols. The radical $R^1$ then stands, for example, for phenyl, 2-methyl-phenyl, 3-methyl-phenyl, 4-methyl-phenyl, nonyl-phenyl, 2,4-dimethyl-phenyl, 2,5-dimethyl-phenyl or phenyl-phenyl.

Catalysts of the formula (I) can be prepared by the process described in Inorg. Synthesis 13 (1972), 105. If those catalysts are prepared according to the teachings of U.S. Pat. No. 3,903,120, they can be used as crude products.

Cocatalysts of the formula (II) are commercially available or can, if they contain nitrile groups, be prepared by the processes described in Org. Synth. 52 (1972), 90 or in DE-OS German Published Specification No. 3,430,019, if necessary, in situ before the hydrocyanation.

Preferred cocatalysts of the formula (II) are ethylaluminium dichloride, diethylaluminium chloride, methylaluminium dichloride, triethylaluminium, tripropylaluminium, diethylaluminium cyanide, ethylaluminium dicyanide, aluminium tricyanide, diisopropylaluminium hydride; ethylaluminium dichloride is particularly preferred.

The catalyst of the formula (I) is used in amounts of 0.25 to 5 mole %, preferably 0.5 to 2 mole %, based on one double bond equivalent. The catalyst of the formula (I) and the cocatalyst of the formula (II) are generally used almost in a molar ratio, for example in a ratio of 0.95–1.1:1.

Excess catalyst of the formula (I) does not provide an appreciable advantage, but is not detrimental, either. However, a significant excess of the cocatalyst of the formula (II) reduces the obtainable number of catalytic cycles, based on catalyst (I). This effect can be compensated to a certain degree by a corresponding excess of the ligand of the formula (III), in which case $R^1$ does not necessarily have to be identical with $R^1$ in the catalyst (I). This compensation of the unfavourable influence described impairs the workup of hydrocyanization mixtures so that working with over-stoichiometric amounts of (II) and, if desired, of ligand (III) is less preferred.

Inert solvents are, for example, aromatic and aliphatic hydrocarbons, aromatic halogenohydrocarbons, ethers, nitriles and other polar or non-polar organic liquids without mobile H atoms such as benzene, toluene, xylene, chlorobenzene, dichlorobenzene, tetrahydrofuran, dioxane, glycol ethers or diglycol ethers such as diglyme, acetonitrile or mixtures thereof. As the polarity and thus the solubility of the polymer changes in the course of the hydrocyanation, it may be advisable, if a nonpolar or less polar inert solvent was used at the beginning, to add a more polar solvent during the reaction, for example acetonitrile, dioxane or glycol ethers or diglycol ethers such as diglyme, preferably acetonitrile to maintain an essentially homogeneous reaction solution.

The polymer is reacted in a concentration range from 1 to 10% by weight, based on the total amount of the polymer solution. For the purpose of a high space-time yeild, solutions as concentrated as possible within the range mentioned are preferably used; in the case of polymers with a very high molecular weight, the reaction will be carried out in the lower concentration range in favour of a slighter viscosity of the solution.

The hydrogen cyanide can be introduced into the reaction mixture in various ways, for example as a liquid without solvent, dissolved in a solvent such as acetonitrile, or by means of a carrier gas stream, for example by means of nitrogen or argon. The hydrogen cyanide is generally introduced at the rate of its consumption; a more rapid introduction can impair the activity of the catalyst. Charges of 100 to 300 mmoles of HCN/mmole of (I) per hour at 60° C. are, for example, possible.

The hydrocyanation according to the invention is carried out at a temperature from 35° to 100° C., preferably 45° to 90° C., particularly preferably at 55° to 80° C.

The hydrocyanation according to the invention is preferably carried out at atmospheric pressure. However, it can also be carried out at a slightly reduced pressure, for example down to 0.5 bars or at a slightly increased pressure, for example up to 2 bars, without thereby offering any advantages or disadvantages. A person skilled in the art knows, of course, how to determine optimum experimental conditions with respect to temperature, the amount of catalyst and the charging of hydrogen cyanide in preliminary tests.

EXAMPLE 1.36 g (1.05 mmoles) of $Ni[P(OPh)_3]_4$ were added to a solution of 6 g of 1,2-polybutadiene (vinyl double bonds: 91%; viscosity number $[\eta] = 2.0$ dl/g in toluene at 80° C.) having 111 mmoles of double bond equivalents in 75 ml of chlorobenzene and 42 ml of acetonitrile. With stirring, 1.05 mmoles of $AlEtCl_2$ were slowly added drop-wise as a 1-molar solution in toluene. 4.25 g (157 mmoles) of hydrogen cyanide were then passed into the solution at 50° C. over a period of 4 hours by means of a nitrogen stream.

As the nitrogen stream discharge was not passed through a condenser, the solvent mixture which was partly evaporated had to be replaced; to this end—and also so as not to allow the viscosity to increase by too much—45 ml of acetonitrile were added during the reaction. The increasing acetonitrile content of the solution made it possible to maintain a homogeneous solution. The solvent mixture was subsequently evaporated and the residue was precipitated 2×from DMF/methanol.

The determination of nitrogen (7.7% of N) showed a hydrocyanation degree of 45% of the theoretically possible value. The nitrile groups were detectable by IR spectroscopy.

What is claimed is:

1. A process for preparing cyano-containing polymers, comprising reacting starting polymers having isolated, non-activated double bonds with hydrogen cyanide in the presence of catalysts of the formula

$Ni[P(OR^1)_3]_{n'}$, in which
  $R^1$ stands for alkyl or aryl and
  n denotes the number 3 or 4,
and in the presence of cocatalysts of the formula

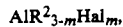
$AlR^2{}_{3-m}Hal_m$, in which
  $R^2$ stands for hydrogen, alkyl or cyano,
  Hal stands for chlorine, bormine or cyano and
  m denotes the number 0, 1, 2 or 3,
in inert organic solvents at a temperature of 35° to 100° C.

2. A process according to claim 1, which further comprises carrying out the process in the presence of a phosphite of the formula

$P(OR^1)_3$, in which $R^1$ stand for alkyl or aryl.

3. A process according to claim 1, wherein the double bonds which do not react with hydrogen cyanide are hydrogenated.

4. A process according to claim 1, wherein the catalyst is used in an amount of 0.25 to 5 mol %, based on one double bond equivalent.

5. A process according to claim 1, wherein the catalyst is used in a molar ratio of 0.95 to 1.1:1.

6. A process according to claim 1, wherein the radicals $OR^1$ in the nickel catalysts are derived from phenols or alkylphenols.

7. A process according to claim 1, wherein the starting polymers comprise $C_4$-$C_5$-diolefins.

8. A process according to claim 1, wherein the starting polymers comprise vinyl side chains.

9. A process according to claim 8, wherein nitrile groups are present in the side chain.

10. A process according to claim 7, wherein the starting polymers comprise polybutadiene.

11. A process according to claim 10, wherein the polybutadiene is 1,2-polybutadiene.

12. A process according to claim 1, wherein the starting polymers have a molecular weight of 1,500 to 500,000.

13. A process according to claim 1, wherein the starting polymers are formed by copolymerization of conjugated dienes with monoolefins or substitution products thereof.

14. A process according to claim 13, wherein the copolymerized monoolefins or substitution products thereof are sytrene, acrylonitrile, acrylic esters, ethylene, propylene or butylene.

15. A process according to claim 1, wherein the starting polymers have a molecular weight of 50,000 to 350,000.

16. A process according to claim 1, wherein the temperature is 45° to 95° C.

17. A process according to claim 1, wherein the temperature is 55° to 80° C.

* * * * *